US011079468B2

(12) United States Patent
Salmi et al.

(10) Patent No.: US 11,079,468 B2
(45) Date of Patent: Aug. 3, 2021

(54) DETECTION OF ACOUSTIC EVENTS

(71) Applicant: ZENNIZ OY, Espoo (FI)

(72) Inventors: Jussi Salmi, Haarajoki (FI); Juha Toivanen, Espoo (FI)

(73) Assignee: COURTIUS OY, Helsinki (FI)

(*) Notice: Subject to any disclaimer, the term of this patent is extended or adjusted under 35 U.S.C. 154(b) by 657 days.

(21) Appl. No.: 15/536,620

(22) PCT Filed: Dec. 14, 2015

(86) PCT No.: PCT/FI2015/050881
§ 371 (c)(1),
(2) Date: Jun. 15, 2017

(87) PCT Pub. No.: WO2016/097479
PCT Pub. Date: Jun. 23, 2016

(65) Prior Publication Data
US 2017/0343644 A1 Nov. 30, 2017

(30) Foreign Application Priority Data
Dec. 15, 2014 (FI) ..................... 20146096

(51) Int. Cl.
G01S 5/30 (2006.01)

(52) U.S. Cl.
CPC .................... G01S 5/30 (2013.01)

(58) Field of Classification Search
CPC ... G01S 5/30; G01S 5/18; G01S 11/16; G01S 11/14; G01S 5/26; G01S 5/14;
(Continued)

(56) References Cited

U.S. PATENT DOCUMENTS 8,314,775 B2* 11/2012 Westerman ........... G06F 3/0235
345/173
8,384,675 B2* 2/2013 Westerman ........... G06F 3/0235
345/173
(Continued)

FOREIGN PATENT DOCUMENTS

FR       2 654 945 A1    5/1991
WO    2008/092138 A1    7/2008

OTHER PUBLICATIONS

Choi et al., "Near field impulsive source localization in a noisy environment", Journal of Sound & Vibration, Mar. 31, 2007, pp. 209-220, vol. 303, No. 1-2, XP022005945.
(Continued)

Primary Examiner — Isam A Alsomiri
Assistant Examiner — Amie M Ndure
(74) Attorney, Agent, or Firm — Nixon & Vanderhye

(57) ABSTRACT

Disclosed is a method for detecting an acoustic event of interest in a space. In the method acoustic signal data is obtained from sensors and at least some candidate impulses are determined. The candidate impulses are mapped to a representation on a basis of an origin of the candidate impulse in question and it is determined, from the generated representation, at least one indication quantity representing a likelihood of an acoustic event of interest taking place in the specified positions in space and time. Finally, the at least one indication quantity is compared to a predetermined threshold and an indication is generated if the at least indication quantity meets the predetermined threshold. Also disclosed is a computing unit and a computer program product.

20 Claims, 3 Drawing Sheets

(58) Field of Classification Search
CPC ........ G01S 5/0036; G01S 5/22; G01S 5/0263;
G01S 1/80; G01S 5/20; G01S 5/186;
G01S 15/42; G01S 15/876; G01S 15/89;
G01S 19/51; G01S 1/042; G01S 1/72;
G01S 3/808; G01S 5/0081; G01S 5/0289;
G01S 15/10; G01S 19/40; G01S 19/42;
G01S 19/45; G01S 19/48; G01S 1/02;
G01S 11/00; G01S 11/02
See application file for complete search history.

(56) References Cited

U.S. PATENT DOCUMENTS

| | | | | |
|---|---|---|---|---|
| 8,441,453 | B2* | 5/2013 | Westerman | G06F 3/0235 345/173 |
| 8,466,880 | B2* | 6/2013 | Westerman | G06F 3/0235 345/173 |
| 8,466,881 | B2* | 6/2013 | Westerman | G06F 3/0235 345/173 |
| 8,907,929 | B2* | 12/2014 | Li | G01S 15/50 345/177 |
| 9,069,058 | B2* | 6/2015 | Booij | G01S 5/30 |
| 9,098,142 | B2* | 8/2015 | Westerman | G06F 3/0235 |
| 9,319,785 | B2* | 4/2016 | Lee | G01S 3/808 |
| 9,342,180 | B2* | 5/2016 | Westerman | G06F 3/0235 |
| 9,348,452 | B2* | 5/2016 | Westerman | G06F 3/0235 |
| 9,383,855 | B2* | 7/2016 | Westerman | G06F 3/0235 |
| 9,552,100 | B2* | 1/2017 | Westerman | G06F 3/0235 |
| 9,810,784 | B2* | 11/2017 | Altman | G01S 13/003 |
| 2002/0181721 | A1* | 12/2002 | Sugiyama | G01H 3/00 381/92 |
| 2003/0142587 | A1* | 7/2003 | Zeitzew | G01S 15/74 367/127 |
| 2007/0121097 | A1* | 5/2007 | Boillot | G01S 15/42 356/28 |
| 2008/0005703 | A1* | 1/2008 | Radivojevic | G06F 3/011 715/863 |
| 2008/0069412 | A1* | 3/2008 | Champagne | G06K 9/00013 382/124 |
| 2008/0084788 | A1 | 4/2008 | Showen et al. | |
| 2010/0316231 | A1* | 12/2010 | Williams | H04R 3/005 381/92 |
| 2012/0001875 | A1* | 1/2012 | Li | G01S 7/5273 345/177 |
| 2012/0063270 | A1 | 3/2012 | Angell et al. | |
| 2013/0301391 | A1* | 11/2013 | Altman | G01S 15/003 367/100 |

OTHER PUBLICATIONS

Nunes et al., "A Steered-Response Power Algorithm Employing Hierarchical Search for Acoustic Source Localization Using Microphone Arrays", IEEE Transactions on Signal Processing, IEEE Service Center, Oct. 1, 2014, pp. 5171-5183, vol. 62, No. 19, XP011557812.

Peterson et al., "Hybrid Algorithm for Robust, Real-Time Source Localization in Reverberant Environments", 2005 IEEE International Conference on Acoustics, Speech, and Signal Processing, Mar. 18, 2005, pp. 1053-1056, vol. 4, XP010792799.

FI Search Report, dated Jun. 11, 2015, from corresponding FI application No. 20146096.

International Search Report, dated Mar. 17, 2016, from corresponding PCT application No. PCT/FI2015/050881.

* cited by examiner

DETECTION OF ACOUSTIC EVENTS

TECHNICAL FIELD

The invention concerns in general the technical field of measurement systems. Especially the invention concerns measurement of acoustic signals in a space in order to detect acoustic events.

BACKGROUND

A space may be monitored in multiple ways. One way is to monitor acoustic signals originating from the space and to make analysis of different type based on the acoustic signals. An example of the utilization of acoustic signal analysis is monitoring of certain ball game, such as tennis. It is possible to implement a solution in which a judgment of at least certain events during a tennis game can be made on the basis of the analysis of acoustic signals. An example is that the judgment if a ball is outside or inside a line, when the ball bounces on the court, is performed by analyzing the acoustic signals originating from the bounce.

However, one challenge in the analysis of acoustic signals is that there exist multiple sources of noise in a space. It is necessary to implement solution by means of which one can filter the noise from the desired acoustic signals. One solution is that microphone arrays configured to obtain the acoustic signals in a space are focused onto a volume of space by appropriately scaling and delaying the signals from the microphones, and then linearly combining the signals from each microphone. As a result, signals from the focal volume add, and signals from elsewhere (i.e., outside the focal volume) tend to cancel out.

Moreover, some filter based solutions can be used, which are implemented either with hardware solution or with software solution. The idea is to filter out noise components from the acoustic signals obtained with the microphones and in such manner to find out the relevant signals for further analysis.

A challenge of the known solutions is that they are not applicable if the position of the noise source is not well known, or if the noise is generated over a relatively large region. A further drawback is that filter based solution operate in the frequency domain to attenuate the signal at pre-defined frequencies and may thus remove relevant signals from the obtained signal data.

Thus, there is need to develop acoustic signal based detection systems in order to apply them in challenging environments. At least one aim is to develop solutions which enable a detection of relevant events within a space

SUMMARY

An objective of the invention is to present a method, a computing unit and a computer program product for detecting an acoustic event. Another objective of the invention is that the method, the computing unit and the computer program product improve a detection of acoustic event in a space.

The objectives of the invention are reached by a method, a computing unit and a computer program product as defined by the respective independent claims.

According to a first aspect, a method for detecting an acoustic event of interest in a space comprising a plurality of sub-spaces is provided wherein the method comprising: a) obtaining acoustic signal data from sensors, wherein the acoustic signal data from the sensors is tied to a common time reference; b) identifying one or more candidate impulses from the acoustic signal data obtained from the sensors; c) defining for each identified candidate impulse at least a time stamp within the common time reference and a sensor coordinate on the basis of the sensor which obtained the acoustic signal identified as candidate impulse; d) determining, for each candidate impulse, a signal source time in each spatial sub-space, in order to generate a representation of an origin of the candidate impulses in specified positions in space and time; e) determining, from the generated representation, at least one indication quantity representing a likelihood of an acoustic event of interest taking place in the specified positions in space and time; f) comparing the at least one indication quantity to a predetermined threshold defined for the indication quantity in question; and g) generating an indication that an acoustic event of interest is detected if the at least indication quantity meets the predetermined threshold defined for the indication quantity in question in at least one sub-space.

The identification may be performed by filtering raw data obtained from at least one sensor.

The step of determining a signal source time may comprise: determining a time scale for a sub-space; dividing the time scale into plurality of bins each bin defining a time window within the time scale; positioning the candidate impulses to the time scale of each sub-space on a basis of source times of the candidate impulses within each sub-space.

The step of determining a signal source time may comprise: determining a grid comprising a spatial position and time as parameters; mapping the candidate impulses into the grid on a basis of source times of the candidate impulses.

The indication quantity may be a weighted sum of candidate impulses in the specified positions in space and time. The weighted sum may be derived in at least one following way: an equal weight is provided for all candidate impulses, a weight derived from amplitude of a candidate impulse in question is provided for the candidate impulses. The amplitude of the candidate impulse in question may be determined from the obtained corresponding acoustic signal.

The method may further comprise: dividing at least the sub-space based on which the indication is generated into further sub-spaces; performing the method steps d), e), f) and g) as above for candidate impulses in the generated further sub-spaces.

According to a second aspect, a computing unit for detecting an acoustic event of interest in a space comprising a plurality of sub-spaces is provided, the computing unit comprising at least one processor; and at least one memory including computer program code; wherein the processor being configured to cause the computing unit at least to perform: a) obtain acoustic signal data from sensors, wherein the acoustic signal data from the sensors is tied to a common time reference; b) identify one or more candidate impulses from the acoustic signal data obtained from the sensors; c) define for each identified candidate impulse at least a time stamp within the common time reference and a sensor coordinate on the basis of the sensor which obtained the acoustic signal identified as candidate impulse; d) determine, for each candidate impulse, a signal source time in each spatial sub-space, in order to generate a representation of an origin of the candidate impulses in specified positions in space and time; e) determine, from the generated representation, at least one indication quantity representing a likelihood of an acoustic event of interest taking place in the specified positions in space and time; f) compare the at least one indication quantity to a predetermined threshold defined for the indication quantity in question; and g) generate an indication that an acoustic event of interest is detected if the at least indication quantity meets the predetermined threshold defined for the indication quantity in question in at least one sub-space.

Furthermore, the computing unit may be configured to perform the identification by filtering raw data obtained from at least one sensor.

The computing unit may be configured to perform the step of determining a signal source time by: determining a time scale for a sub-space; dividing the time scale into plurality of bins each bin defining a time window within the time scale; positioning the candidate impulses to the time scale of each sub-space on a basis of source times of the candidate impulses within each sub-space.

Alternatively or in addition, the computing unit may be configured to perform the step of determining a signal source time by: determining a grid comprising a spatial position and time as parameters; mapping the candidate impulses into the grid on a basis of source times of the candidate impulses.

The computing unit may be configured to determine the indication quantity as a weighted sum of candidate impulses in the specified positions in space and time. The weighted sum may be derived, by configuring the computing unit accordingly, in at least one following way: an equal weight is provided for all candidate impulses, a weight derived from amplitude of a candidate impulse in question is provided for the candidate impulses. The amplitude of the candidate impulse in question may be determined, by configuring the computing unit accordingly, from the obtained corresponding acoustic signal.

The computing unit may further be configured to perform steps of: dividing at least the sub-space based on which the indication is generated into further sub-spaces; performing the method steps d), e), f) and g) as above for candidate impulses in the generated further sub-spaces.

According to a third aspect, a computer program product is provided, wherein the computer program product comprises portions of computer program code configured to perform any methods as disclosed above when at least some portion of the computer program code is executed in a computing unit.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
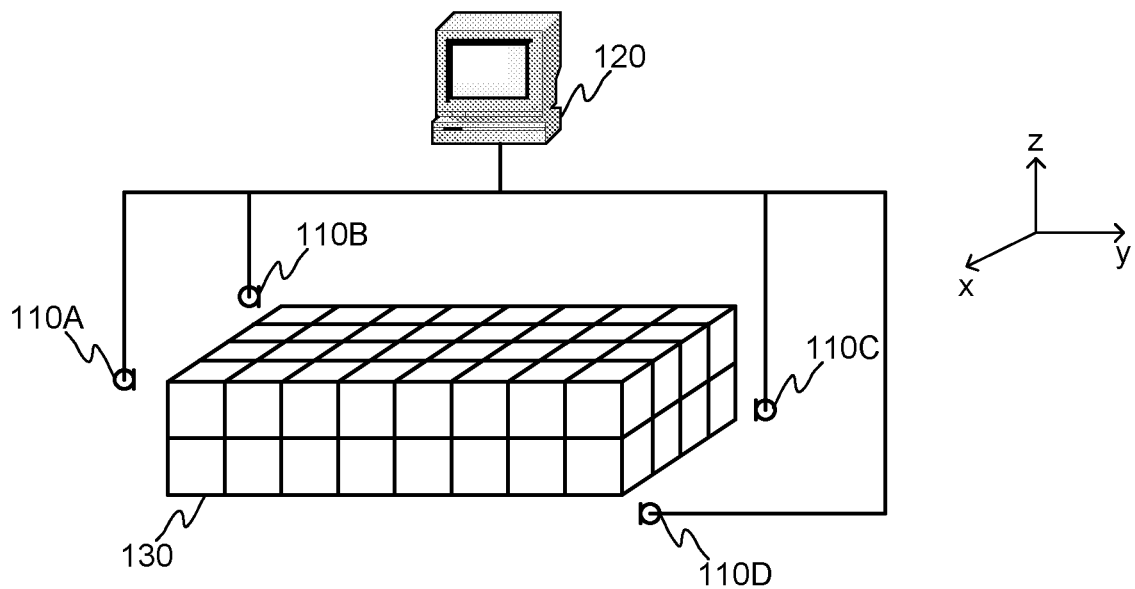
FIG. 1 illustrates schematically the environment in which the present invention is applicable.

FIG. 1 illustrates schematically the environment in which the present invention is applicable. A set of sensors 110A-110D, such as transducers of microphone type, are positioned in known positions in a coordinate system with respect to a volume of interest. In other words, the sensors may be positioned in the volume of interest or around the volume of interest. The positions of the sensors 110A-110D are advantageously known either through measurement or through calibration. Acoustic signal data is obtained with the sensors 110A-110D and it is delivered to a computing unit 120, which is configured to perform pre-defined operation to the obtained data. The operations are defined in portions of computer program code stored in a location accessible by the computing unit 120. The computing unit 120 is configured to execute the portions of computer program code in order to achieve the effect according to the invention as will be described. The volume of interest is a space 130 divided to a plurality of sub-spaces for the purpose of the invention. The space is a three dimensional volume, wherein acoustic events of interest happen. Naturally, the sensors may receive acoustic signals from events happening outside the space of interest. For example, the space may be a volume on a tennis court wherein events, such as strokes, bounces, footsteps or similar, are monitored by means of acoustic signal detection.

In order to perform the operations as will be described the detected acoustic signal data by different sensors shall be attached to a same time space. This may be achieved by arranging a common time reference, i.e. common clock signal, to the system and assigning a time stamp complying with the common time reference for at least some of the obtained acoustic signal data. The assignment of the time stamp may be performed by the computing unit 120. If the obtained acoustic signal data is in an analogous form, the computing unit 120 is configured to sample the obtained data prior to assigning the time stamps to the data. If the sensors 110A-110D provide digital data, the computing unit 120 assigns the time stamps directly to the discrete data obtained from the sensors 110A-110D. According to another embodiment of the invention the sensors 110A-110D may be configured to assign the time stamps directly to the obtained data. In such an implementation the common clock signal is provided to the sensors 110A-110D e.g. from the computing unit 120 or from any other entity.

Figure 2:
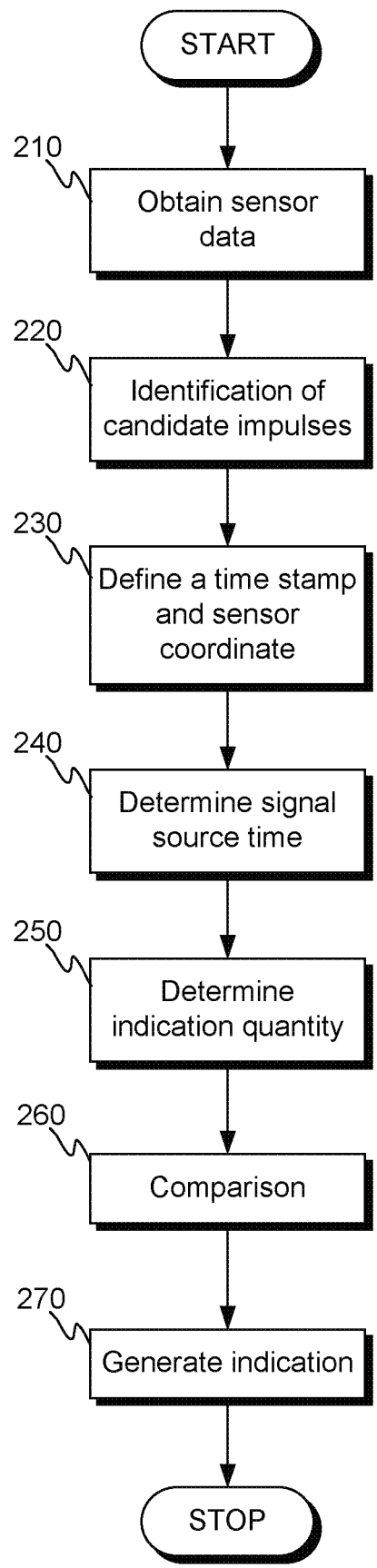
FIG. 2 illustrates an example of the method according to an embodiment of the invention.

Next a method according to an example of the invention is described by referring to FIG. 2. First, the acoustic signal data is obtained 210 from sensors 110A-110D configured to measure the space in question. The obtained acoustic signal data is delivered to the computing unit 120, which is arranged, in this embodiment, to assign the time stamps to the obtained acoustic signal data. Furthermore, the computing unit 120 may be configured to assign a sensor identifier, or even a coordinate information of the sensor from which the signal data in question is obtained, to the obtained acoustic signal data accordingly, if the sensors 110A-110D have not provided the information directly by themselves.

In step 220 the computing unit 120 is configured to identify one or more candidate impulses from the obtained data. The candidate impulse refers to an impulse type signal data, which may represent information on an impulse type event detected by at least one sensor. The identification may be based on a pre-filtering the obtained information, i.e. pre-filtering the raw data in some predefined manner. The pre-filtering may be based on a plurality of principles. For example, one applicable pre-filtering scheme is based on detecting local maximums and minimums meeting predefined thresholds and defining such data values as candidate impulses for further processing. Alternatively or in addition, the pre-filtering may e.g. be arranged with so called matched filtering, which provides a tool for forming an impulse-type signal data from the raw data when the raw data comprises an acoustic event which matches well with filter response. It may also be arranged that the sensors comprise the pre-filtering functionality in which case the computing unit 120 directly receives the candidate impulses as an input.

Next, in step 230, the computing unit 120 is configured to define at least the time stamp and the sensor coordinate assigned to each identified candidate impulse. Furthermore, the computing unit 120 may be configured to define, from the obtained acoustic signal(s) identified as the candidate impulse(s), amplitude for each identified candidate impulse(s) for purposes to be discussed later. If the identified candidate impulse is arranged to carry information on the sensor identifier, the computing unit may be arranged to determine the sensor coordinate by means of the sensor identifier information. For example, the information on a sensor coordinate may be stored together with a corresponding sensor identifier in a memory accessible by the computing unit 120 from which it is possible to query the sensor coordinate by means of the sensor identifier. As a result of steps 210, 220 and 230 the computing unit 120 comprises information on candidate impulses, which may represent information on an impulse type event and wherein each candidate impulse is provided at least with a time stamp and with a sensor coordinate, and additionally with amplitude information if applicable.

Next, the computing unit is configured to determine for each candidate impulse a signal source time 240 in each spatial sub-space based on known sensor coordinate. In other words the aim is to determine at which time the candidate impulse would have been produced at each spatial sub-space i.e. when an event has happened in each sub-space. The computation may be performed with the following equation:

$$T_{n,i} = t_i - \frac{|d_n - s_{m,i}|_F}{v_s},$$

wherein
- $T_{n,i}$ is an instant of time when an impulse signal i is produced at the center of the sub-space n, where $n \in 1, \ldots, N$;
- $t_i$ is the instant of time (time stamp) when an impulse signal i is detected in a sensor;
- $d_n$ is a vector $d_n = [d_{x,n}\ d_{y,n}\ d_{z,n}]$ describing the spatial position of a center of the $n^{th}$ sub-space in the space of interest;
- $s_{m,i}$ is a vector $S_m = [s_{x,m}\ S_{y,m}\ S_{z,m}]^T$ describing the spatial position of sensor, where $m \in 1, \ldots, M$;
- $|d_n - s_{m,i}|_F$ denotes the Eucledian distance between $d_n$ and $s_{m,i}$, $|\cdot|_F$ denotes the Frobenius norm, and
- $v_s$ is a velocity of sound.

The outcome of the step 240 is that for each candidate impulse it is determined at least a signal source time at the center of each sub-space in the space.

Based on the determination 240 a representation of an origin of the candidate impulses is generated in specified positions in space and time. In other words, the sub-space and the source time are used as parameters in the representation.

Figure 3:
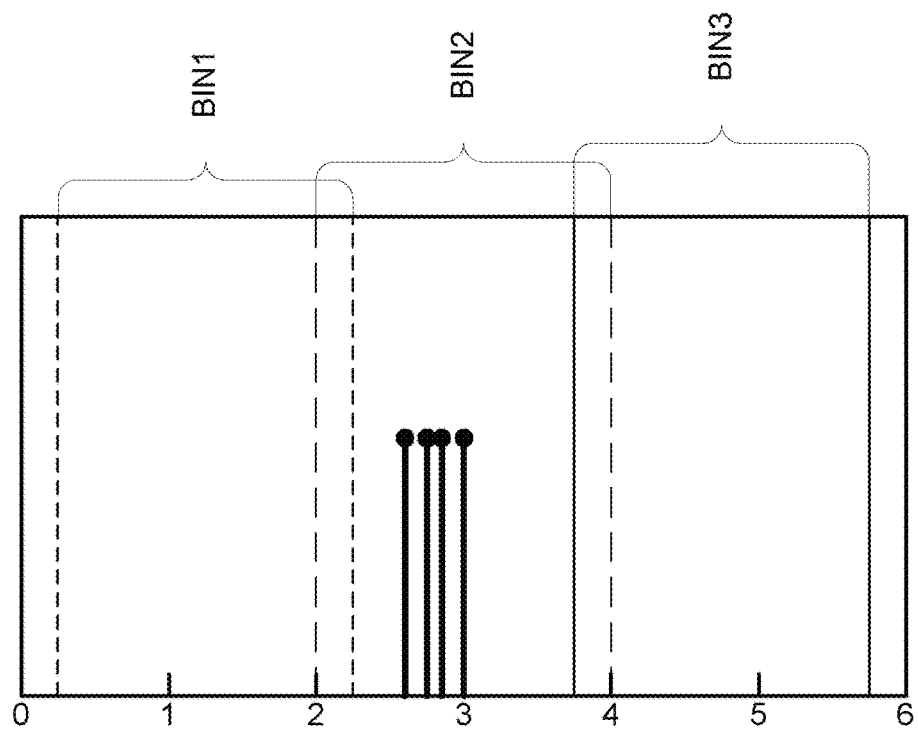
FIG. 3 illustrates an example of a representation of candidate impulses according to an embodiment of the invention.

According to a first embodiment of the invention the representation may be generated by mapping the candidate impulses resulting from an event to time scale on a basis of the determined source times on a sub-space basis. The time scale is determined so that it spans sufficiently long history so that new candidate impulses may be mapped, i.e. represented, in each sub-space based on their respective source times in each sub-space. Further, the time scale defined for sub-space may be divided into a number of bins, as depicted in an exemplified way in FIG. 3. The bins (BIN1, BIN2, BIN3), in FIG. 3, are overlapping, but the overlapping is not necessary. The bins define time windows within the time scale defined for a sub-space. Now, as the source time occurrences are mapped within the time scale (the black lines with circle tops in the axis (within BIN2) it is possible to analyze the amount, i.e. number, of occurrences within a bin. Hence, by defining a predetermined threshold, e.g. a minimum number of occurrences, per a bin, it is possible to determine if the threshold is met in some bin or not.

According to another embodiment of the invention the representation may be generated by establishing a four dimensional (4D) grid, wherein the dimensions are x, y, z coordinates and time t, which time refers to source time. Now, the event(s) detected by one or more sensors, i.e. all candidate impulses, are mapped in the four dimensional grid, which corresponds to the representation.

In response to the generation of the representation it is determined 250, from the generated representation, at least one indication quantity representing a likelihood of an acoustic event of interest taking place in the specified positions in space and time. The indication quantity may be a weighted sum of candidate impulses in the specified positions in space and time. According to a first example of the invention an equal weight is applied in the summing of candidate impulses. According to another example, the weights for candidate impulses are derived from the obtained acoustic signal(s) identified as the candidate impulse(s). Example weights of such indication quantities comprise the amplitudes, the absolute values of the amplitudes and the squared amplitudes.

Next, the at least one indication quantity is compared to a predetermined threshold defined for the indication quantity in question. For example, if the candidate impulses are mapped in a time scale, it may be determined if the indication quantity comprises a predetermined number of candidate impulses with an equal weight is mapped to a time scale defined for the sub-space in question, or within a distance to each other in the time scale. The determination, if a predetermined number of candidate impulses is mapped in the time scale in a predetermined manner, may e.g. be performed by setting a predetermined threshold for the amount.

Figure 4:
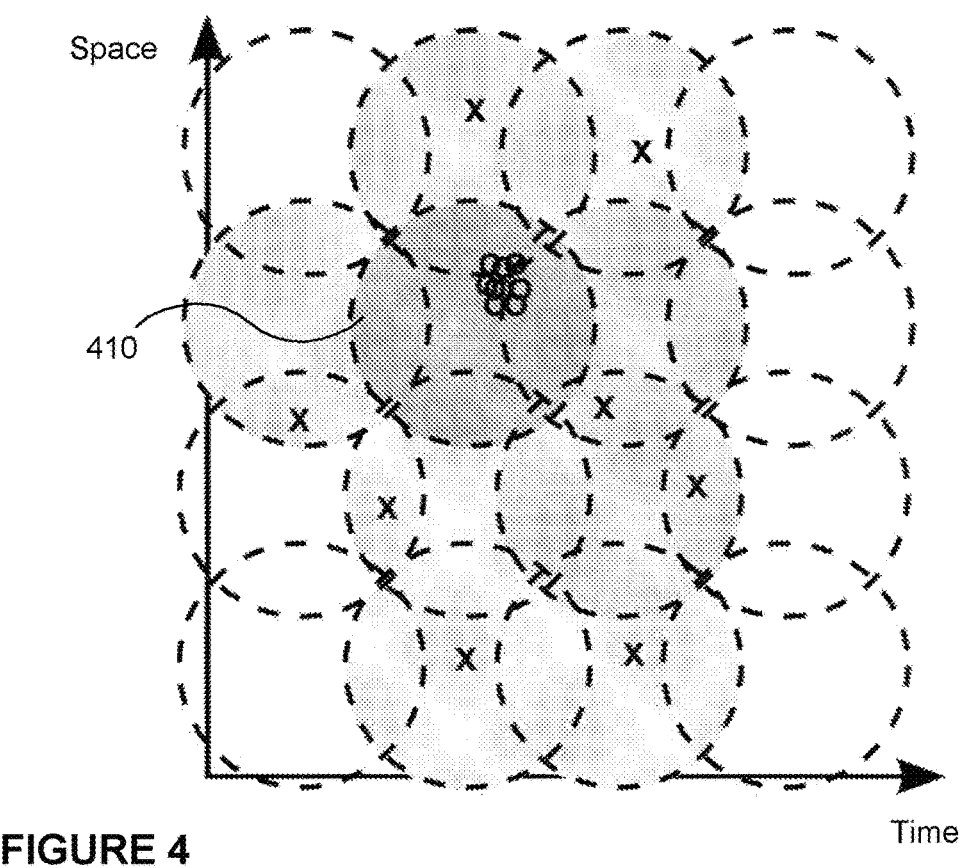
FIG. 4 illustrates another example of a representation of candidate impulses according to another embodiment of the invention.

If the candidate impulses are mapped in the 4D grid, as described above, the predetermined threshold may be defined so that it is determined if one or more cells defined by x, y and z coordinates and source time within the 4D grid comprises a predetermined number of mapped candidate impulses. Such a situation is depicted in FIG. 4 in an exemplified manner. The x axis is time and y axis refers to space defined as x, y, z points. As may be seen from FIG. 4 the spaces are defined as overlapping spaces. All such spaces which comprise at least one indication are colored in grey scale. The candidate impulses of no interest, i.e. irrelevant impulses, are marked as X and impulses of interest are marked with O. The difference between these two is performed by setting a threshold for occurrences in a cell, or within sub-area or sub-volume of the cell. If the threshold is met in a sub-space, i.e. exceeded, the candidate impulses are likely to be relevant and the sub-space is indicated (reference number 410 in FIG. 4). In some implementation of the 4D grid it is also possible to combine spatially multiple grid points, i.e. positions within the grid, and thus to sum up the amount, i.e. number, of candidate impulses within the combined positions and in this manner to optimize the determination.

In step 270, an indication on a detection of an acoustic event of interest is generated if the at least indication quantity meets the predetermined threshold defined for the indication quantity in question in at least one sub-space (e.g. in at least one bin within the time scale). The meeting of threshold means that the threshold set for the indication is fulfilled (e.g. exceeded). According to an embodiment of the invention a special treatment for evaluating if the threshold is met or not shall be arranged for such a case that there simultaneously within a time window exist an equal number of occurrences in multiple bins wherein the number of occurrences meets the threshold. The special treatment may e.g. be based on a principle in which the indication is arranged to be performed to the bin, which is the closest to a centre of mass of all occurrences being involved in the determination. Similarly, a special treatment in case of 4D grid may be established if it turns out the multiple cells within the grid comprises an equal number of occurrences. The generation of the indication on a detection of an acoustic event may further generate more information with respect to the event. More specifically, the indication on a detection of an acoustic event provides useful information in terms of: 1) It is very likely that an event occurred in the indicated space and time, and 2) The candidate impulses involved in the detection are verified as likely resulting from an event of interest.

When the subset of time stamped impulses are validated as likely relevant through the proposed method, they may be used e.g. as an input for more sophisticated high accuracy position algorithms, which would otherwise be sensitive to errors in their input data. Furthermore, as the impulses also indicate a common time reference on the raw signals from various sensors, it is possible to perform signal classification by performing specialized processing using a data windows from the data buffers from each involved sensor, respectively, using the validated impulse time stamps as the common time reference for extracting the respective data windows from the individual sensors. Thirdly, the coarse information of the source time and position obtained by the method may be used to extract additional impulses from data buffers of the sensors that had missed the detection in the first phase, i.e. those sensors not included in the set of validated impulses. Hence, further processing on the verified candidate impulses may lead to enhanced positioning, timing, and classification of the acoustic event.

The space under detection in the method is divided into predetermined sub-spaces, as described above. The division is performed for the purpose of analyzing the events within the space. The size of the sub-spaces may vary and the impact of varying size of the sub-spaces is that it provides a tool for adjusting the accuracy of the solution. A rule of thumb is that the smaller the sub-spaces are the more accurate the detection is. In some implementation of the invention it is possible to define multiple sizes for the sub-spaces or even to combine the sub-space in the method. For example, if it is assumable that occurrence of event in some spatial area in the space is unlikely, or irrelevant e.g. in a sense of result, it is e.g. possible to combine the sub-spaces locally within the space.

Moreover, in some embodiments of the invention, after initial round of the method steps 210-270, the at least one sub-space which caused the detection, i.e. generated an indication, may be divided into further, i.e. smaller or finer, sub-spaces, and steps 240-270 may be repeated using this finer sub-space division i.e. the candidate impulses in the finer sub-spaces are evaluated accordingly. This second iteration is useful in order to either provide better estimate of the time and location, or to perform rejection of irrelevant impulses which did not actually result from the event of interest although they were included in the same initial sub-space by a chance. In some implementation at least some of the neighboring sub-spaces to the sub-space, which generated the indication, may be taken into the further division.

The generation of indication may be performed in multiple ways. For example, the computing unit may be configured to provide a sound or a visual effect representing the indication. In some further embodiments the indication may be arranged so that a 3D image is generated on a display, wherein the position of the event producing the indication is illustrated in the space under detection. Alternatively or in addition, the indication may be arranged so that generated information on the event is stored in a memory accessible by the computing unit. The mentioned ways to generate the indication are only examples and the invention is not limited to these examples only.

The above described method may be applied in multiple application areas. The solution is especially advantageous for monitoring events in a ball game, such as in tennis. In tennis there exists some predetermined events, such as strokes and bounces, within a space, i.e. in a volume within the area of tennis court. In other words, the aforementioned processing steps, either directly or indirectly, may provide necessary information for acoustic tracking of events in a ball game, such as tennis, enabling to make line-calls, animate single shots and rallies, estimate ball trajectories and shot speeds etc. These pieces of information may be utilized for not only providing information for the audience of a ball game, but making further statistical analysis of individual players style of play to develop their game.

Figure 5:
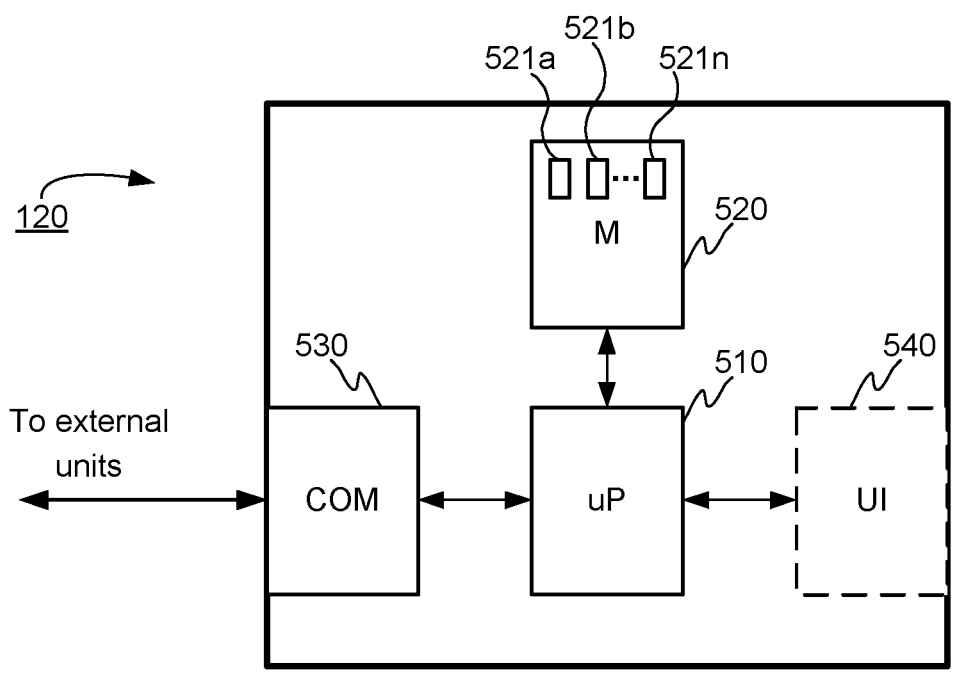
FIG. 5 illustrates an example of a computing unit according to an embodiment of the invention.

As already explained the FIG. 1 disclosed schematically the environment, and the system, according to the invention. The system comprises a computing unit 120 and a plurality of sensors arranged in the space, or around it. FIG. 5 discloses an example of the computing unit 120 according to the invention. The computing unit 120 may comprise one or more processors 510, one or more memories 520 being volatile or non-volatile for storing portions of computer program code 521*a*-521*n* and any data values, a communication interface 530 and possibly one or more user interface units 540. Additionally, the computing unit 120 comprises communication interface which provides interface to communicate with any external units, such as the mentioned sensors 110A-110D and any other devices, such as a display for outputting information with respect to events. The communication interface may be based on any known communication technology, either wired or wireless, in order to exchange pieces of information as described earlier.

The computing unit 120 is configured to implement the method as described. The implementation of the method may be achieved by arranging the processor 510 to execute at least some portion of computer program code 521a-521n stored in the memory 520 causing the processor 510, and thus the computing unit 120, to implement one or more method steps as described. The processor 510 is thus arranged to access the memory 520 and retrieve and store any information therefrom and thereto. Moreover, the processor 510 is configured to control the communication through the communication interface 530 with any external unit, such as with the sensors. The processor 510 may also be configured to control the output of information, i.e. data. The processor 510 may also be configured to control storing of obtained and determined information. For sake of clarity, the processor herein refers to any unit suitable for processing information and control the operation of the apparatus, among other tasks. The mentioned operations may e.g. be implemented with a microcontroller solution with embedded software. Similarly, the invention is not limited to a certain type of memory only, but any memory type suitable for storing the described pieces of information may be applied in the context of the present invention. Some non-limiting examples of a computing unit 120 as described may be a personal computer, a laptop computer, a server, a mobile communication device, a tablet computer, a wrist-computer, a specific circuit connectable to other apparatus, device or system, and so on.

An example of the invention also relates to a non-transitory computer-readable storage medium, which stores at least portions of computer program code, wherein the portions of computer program code are computer-executable to implement the method steps in a computing unit or in a system as described. In general, the computer-readable storage medium may include a storage medium or memory medium, such as magnetic or optical media e.g. disc, DVD/CD-ROM, volatile or non-volatile media, such as RAM. The computer program code may be written in any form of programming language, including compiled or interpreted languages, and the computer program may be deployed in any form, including as a stand-alone program or as a subroutine, element or other unit suitable for use in a computing environment. A computer program code may be deployed to be executed on one computer or on multiple computers at one site or distributed across multiple sites and interconnected by a communication network. This definition comprises also any solutions based on so called cloud computing. The computer program code comprises instructions for causing the computing unit to perform one or more of the method steps as described above.

A minimum number of sensors suitable for detecting acoustic signals is four in order to implement the invention as described. In practice, however, it is preferred that the number of sensors is more than four for improving an accuracy of the invention. For example, it may be arranged that there are at least two sensors are positioned per each face defining the volume of interest. In order to improve the accuracy of the present invention it may be arranged so that obtained signals from different predefined sensors are compared and if a match is found the obtained signal may be considered as reliable. Furthermore, it may be arranged that not all sensors, the obtained signals from all sensors, are used in calculations for each sub-space.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method for detecting an acoustic event of interest within a three-dimensional volume of three-dimensional space comprising a plurality of sub-spaces, the method comprising:
   a) obtaining acoustic signal data arising from acoustic events generated within the volume of three-dimensional space, by way of a plurality of sensors respectively positioned at known locations around and exterior to the three-dimensional space, wherein the acoustic signal data obtained by way of the sensors is tied to a common time reference,
   b) identifying one or more candidate impulses from the acoustic signal data obtained from the sensors,
   c) defining for each identified candidate impulse of the one or more candidate impulses at least a time stamp within the common time reference and a sensor coordinate on the basis of a sensor of the sensors which obtained the acoustic signal identified as the candidate impulse,
   d) determining, for each candidate impulse, a signal source time in each spatial sub-space of the plurality of sub-spaces within the three-dimensional space, in order to generate a representation of an origin of the one or more candidate impulses in positions in the three-dimensional space and time,
   e) determining, from the generated representation, at least one indication quantity representing a likelihood of an acoustic event of interest taking place in the positions in the three-dimensional space and time,
   f) comparing the at least one indication quantity to a predetermined threshold defined for the indication quantity in question, and
   g) generating an indication that an acoustic event of interest is detected when the at least one indication quantity meets the predetermined threshold defined for the indication quantity in question in at least one sub-space within the three-dimensional space.

2. The method of claim 1, wherein the identification is performed by filtering raw data obtained from at least one sensor of the sensors.

3. The method of claim 1, wherein the determining of the signal source time in each spatial sub-space comprises:
   determining a time scale for each sub-space;
   dividing the time scale into a plurality of bins, each bin defining a time window within the time scale; and
   positioning the candidate impulses to the time scale of each sub-space on a basis of source times of the candidate impulses within each sub-space.

4. The method of claim 1, wherein the step of determining the signal source time in each spatial sub-space comprises:
   determining a grid comprising a spatial position and time as parameters; and
   mapping the candidate impulses into the grid on a basis of source times of the candidate impulses.

5. The method of claim 1, wherein the indication quantity is a weighted sum of candidate impulses in the specified positions in space and time.

6. The method of claim 5, wherein the weighted sum is derived as follows:
an equal weight is provided for all candidate impulses, and
a weight derived from amplitude of each candidate impulse is provided for the candidate impulses.

7. The method of claim 6, wherein the amplitude of each candidate impulse is determined from the obtained corresponding acoustic signal.

8. The method of claim 1, the method further comprising:
dividing the at least one sub-space based on whether the at least one indication is generated into further sub-spaces; and
performing the steps d), e), f) and g) for candidate impulses in the generated further sub-spaces.

9. A computing unit for detecting an acoustic event of interest in a space comprising a plurality of sub-spaces, the computing unit comprising:
at least one processor; and
at least one memory having computer program code stored therein,
wherein the computer code is configured to cause, upon execution by the at least one processor, the computing unit to perform the method of claim 1.

10. A non-transitory computer readable medium on which is stored a computer program, comprising portions of computer program code that, upon execution by a processor of a computing unit, causes the computing unit to perform the method of claim 1.

11. The method of claim 2, wherein the determining of the signal source time in each spatial sub-space comprises:
determining a time scale for each sub-space;
dividing the time scale into a plurality of bins, each bin defining a time window within the time scale; and
positioning the candidate impulses to the time scale of each sub-space on a basis of source times of the candidate impulses within each sub-space.

12. The method of claim 2, wherein the step of determining the signal source time in each spatial sub-space comprises:
determining a grid comprising a spatial position and time as parameters; and
mapping the candidate impulses into the grid on a basis of source times of the candidate impulses.

13. A computing unit for detecting an acoustic event of interest in a space comprising a plurality of sub-spaces, the computing unit comprising:
at least one processor; and
at least one memory having computer program code stored therein,
wherein the computer code is configured to cause, upon execution by the at least one processor, the computing unit to perform the method of claim 2.

14. A computing unit for detecting an acoustic event of interest in a space comprising a plurality of sub-spaces, the computing unit comprising:
at least one processor; and
at least one memory having computer program code stored therein,
wherein the computer code is configured to cause, upon execution by the at least one processor, the computing unit to perform the method of claim 3.

15. A computing unit for detecting an acoustic event of interest in a space comprising a plurality of sub-spaces, the computing unit comprising:
at least one processor; and
at least one memory having computer program code stored therein,
wherein the computer code is configured to cause, upon execution by the at least one processor, the computing unit to perform the method of claim 4.

16. A computing unit for detecting an acoustic event of interest in a space comprising a plurality of sub-spaces, the computing unit comprising:
at least one processor; and
at least one memory having computer program code stored therein,
wherein the computer code is configured to cause, upon execution by the at least one processor, the computing unit to perform the method of claim 5.

17. A computing unit for detecting an acoustic event of interest in a space comprising a plurality of sub-spaces, the computing unit comprising:
at least one processor; and
at least one memory having computer program code stored therein,
wherein the computer code is configured to cause, upon execution by the at least one processor, the computing unit to perform the method of claim 6.

18. A computing unit for detecting an acoustic event of interest in a space comprising a plurality of sub-spaces, the computing unit comprising:
at least one processor; and
at least one memory having computer program code stored therein,
wherein the computer code is configured to cause, upon execution by the at least one processor, the computing unit to perform the method of claim 7.

19. A computing unit for detecting an acoustic event of interest in a space comprising a plurality of sub-spaces, the computing unit comprising:
at least one processor; and
at least one memory having computer program code stored therein,
wherein the computer code is configured to cause, upon execution by the at least one processor, the computing unit to perform the method of claim 8.

20. A non-transitory computer readable medium on which is stored a computer program, comprising portions of computer program code that, upon execution by a processor of a computing unit, causes the computing unit to perform the method of claim 2.

* * * * *